(12) United States Patent
Park et al.

(10) Patent No.: US 9,892,129 B2
(45) Date of Patent: Feb. 13, 2018

(54) DISTRIBUTED FILE SYSTEM AND OPERATING METHOD OF THE SAME

(71) Applicant: ELECTRONICS AND TELECOMMUNICATIONS RESEARCH INSTITUTE, Daejeon (KR)

(72) Inventors: Jeong Sook Park, Daejeon (KR); Young Chang Kim, Daejeon (KR); Young Kyun Kim, Daejeon (KR); Hong Yeon Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 113 days.

(21) Appl. No.: 15/158,781

(22) Filed: May 19, 2016

(65) Prior Publication Data
US 2017/0192964 A1  Jul. 6, 2017

(30) Foreign Application Priority Data

Dec. 30, 2015  (KR) .................. 10-2015-0189369

(51) Int. Cl.
  *G06F 15/16*  (2006.01)
  *G06F 17/30*  (2006.01)
  *G06F 11/20*  (2006.01)
  *H04L 29/08*  (2006.01)
  *H04L 29/06*  (2006.01)

(52) U.S. Cl.
  CPC ........ *G06F 17/302* (2013.01); *G06F 11/2033* (2013.01); *H04L 67/06* (2013.01); *H04L 67/1097* (2013.01); *H04L 67/42* (2013.01); *G06F 2201/805* (2013.01)

(58) Field of Classification Search
  CPC ............. G06F 11/0727; G06F 11/3034; G06F 17/30194; G06F 17/30197
  USPC .......................................................... 714/6.2
  See application file for complete search history.

(56) References Cited

U.S. PATENT DOCUMENTS

| 6,718,428 | B2 | 4/2004 | Lee et al. |
| 6,928,459 | B1* | 8/2005 | Sawdon ............ G06F 17/30067 |
| 7,765,385 | B2 | 7/2010 | Darrington et al. |

(Continued)

FOREIGN PATENT DOCUMENTS

KR  10-2013-0093736 A   8/2013

OTHER PUBLICATIONS

Hsiao et al., "Load Rebalancing for Distributed File Systems in Clouds", May 2013, IEEE Transactions on Parallel and Distributed Systems, vol. 24, No. 5, p. 951-962. (Year: 2013).*

*Primary Examiner* — Chae M Ko
(74) *Attorney, Agent, or Firm* — LRK Patent Law Firm

(57) ABSTRACT

A distributed file system based on a torus network includes a plurality of metadata servers configured to store metadata of files, a plurality of data servers configured to divide data and store the divided data in a distributed manner, and at least one management server configured to manage the metadata servers and the data servers. The plurality of metadata servers, the plurality of data servers, and the at least one management server are disposed on first to $n^{th}$ planes each of which consists of a plurality of nodes, and the first plane is connected to a plurality of clients through a switch.

20 Claims, 10 Drawing Sheets

(56) References Cited

U.S. PATENT DOCUMENTS

| | | |
|---|---|---|
| 2005/0235286 A1* | 10/2005 | Ballew .................. G06F 9/5038 718/100 |
| 2010/0161657 A1 | 6/2010 | Cha et al. |
| 2012/0151292 A1* | 6/2012 | Rowstron ............. G06F 9/5066 714/748 |
| 2012/0166582 A1* | 6/2012 | Binder .................... H04L 63/18 709/217 |
| 2013/0086356 A1* | 4/2013 | Narang ............. G06F 15/17318 712/30 |
| 2014/0226479 A1 | 8/2014 | Fricker |
| 2015/0149819 A1 | 5/2015 | Lee |

* cited by examiner

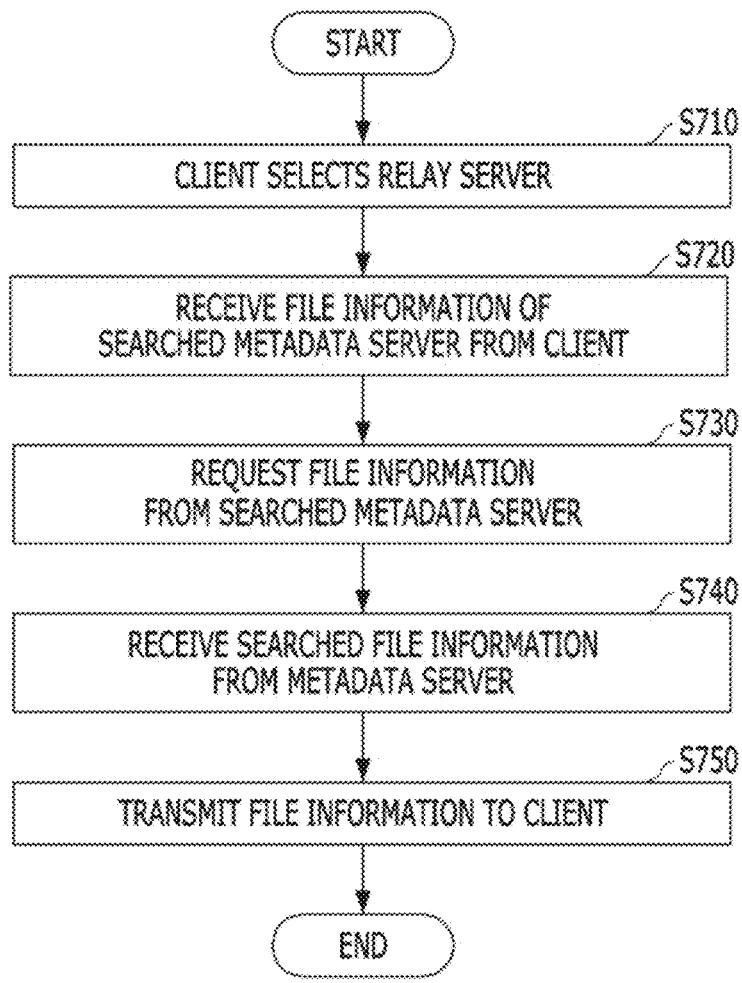

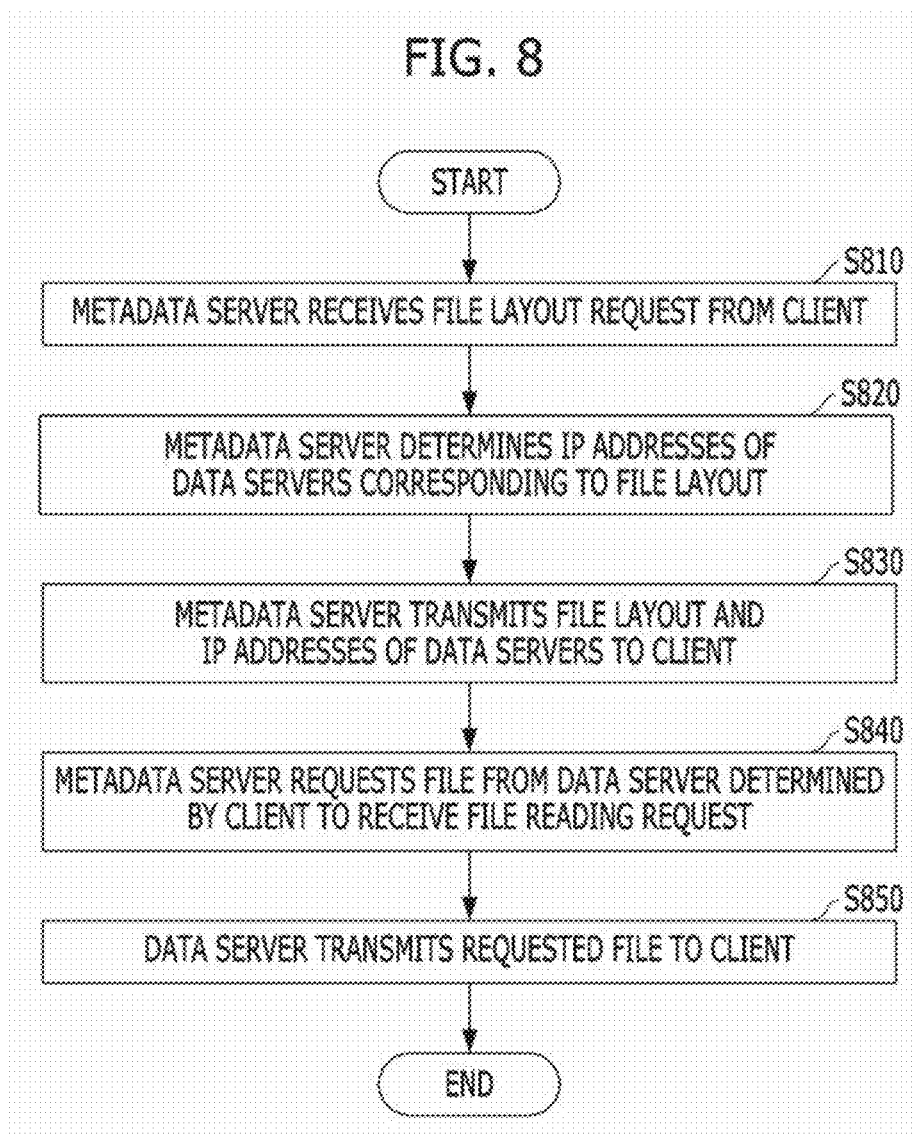

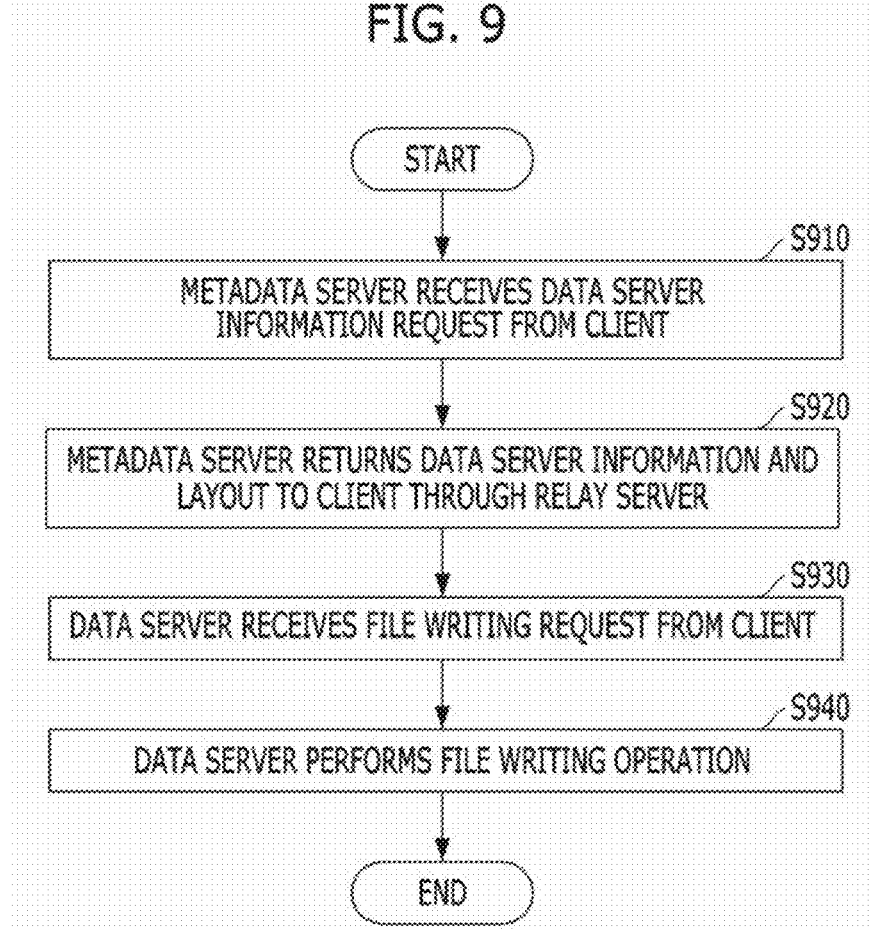

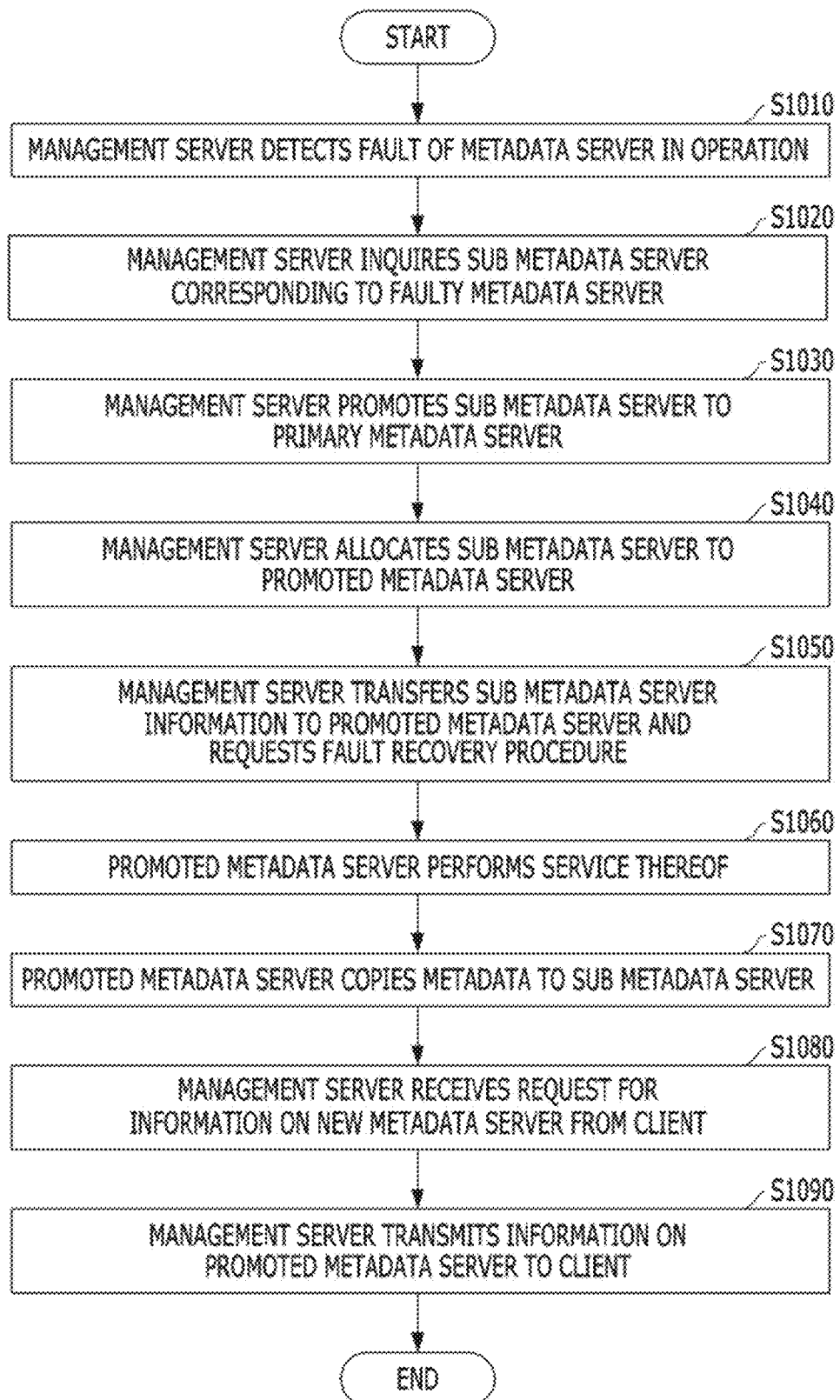

DISTRIBUTED FILE SYSTEM AND OPERATING METHOD OF THE SAME

CROSS-REFERENCE TO RELATED APPLICATION

This application claims priority to and the benefit of Korean Patent Application No. 2015-0189369, filed on Dec. 30, 2015, the disclosure of which is incorporated herein by reference in its entirety.

BACKGROUND

1. Field of the Invention

The present invention relates to a distributed file system and an operating method of the same.

2. Discussion of Related Art

Recently, with the prevalence of smart phones, tablet personal computers (PCs), wearable devices, etc., unstructured high-quality data is continuously increasing. Accordingly, an increase in the capacity of a cloud storage is becoming problematic. Also, a large amount of data generated from Internet of things (IoT) communication in which things are interconnected and virtualized is stored in a cloud storage. Therefore, there is an urgent need to develop a cost-effective high-capacity cloud storage technology.

Meanwhile, it is necessary to develop an exabyte (EB)-level cloud storage by a point in time at which the amount of generated data is expected to be about 44,000 EB around 2020. While not a small number of petabyte-level cloud storages have already been developed, the development an EB-level cloud storage may be an intractable problem which is difficult to be solved with existing technologies.

A considerable number of storage servers are required to provide an EB-level cloud storage. Also, a fat-tree network topology with switches which has been widely used to construct a network has limitations in terms of cost and structural complexity for supporting high availability.

To overcome these limitations, there is the torus network in which servers are directly interconnected without a switch, and a network of calculation nodes among Japanese K-computer or Cray's Titan and super computers is in use. However, there is no example of a network of storage nodes yet.

In this regard, Korean Patent Publication No. 10-2013-0093736 (title: Routing system and method using torus topology in on-chip network) discloses a routing system and method for minimizing the size of an additional buffer (virtual channel) through deadlock recovery with tokens (DRT) while using abundant wires provided by a two-dimensional (2D) torus topology.

SUMMARY OF THE INVENTION

The present invention is directed to providing an exabyte (EB)-level distributed file system in which storage servers are directly interconnected to form a torus topology without a switch and clients are connected to a switch and an operating method thereof.

Objectives of the present invention are not limited to that mentioned above, and other objectives will be apparent to those of ordinary skill in the art from the description below.

According to an aspect of the present invention, there is provided a distributed file system based on a torus network including: a plurality of metadata servers configured to store metadata of files; a plurality of data servers configured to divide data and store the divided data in a distributed manner; and at least one management server configured to manage the metadata servers and the data servers. Here, the plurality of metadata servers, the plurality of data servers, and the at least one management server are disposed on first to $n^{th}$ planes each of which consists of a plurality of nodes, and the first plane is connected to a plurality of clients through a switch.

According to another aspect of the present invention, there is provided an operating method of a distributed file system including a plurality of metadata servers, a plurality of data servers, and at least one management server disposed on first to $n^{th}$ planes consisting of a plurality of nodes, the operating method including: initializing and starting the management server; activating, by the management server, routing functions of the plurality of metadata servers and the plurality of data servers included in the first to $n^{th}$ planes; initializing and starting, by the management server, the plurality of metadata servers; receiving, by the management server, information on the plurality of metadata servers and registering the plurality of metadata servers; setting, by the management server, an availability relationship of the plurality of metadata servers; initializing and starting, by the management server, the plurality of data servers; and receiving, by the management server, information on the plurality of data servers and registering the plurality of data servers. Here, a plurality of metadata servers and a plurality of data servers included in the first plane are each directly interconnected with a plurality of metadata servers and a plurality of data servers included in the second to $n^{th}$ planes without a switch.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 7 is a flowchart of a file opening operation in the operating method of a distributed file system according to an exemplary embodiment of the present invention;

FIG. 8 is a flowchart of a file reading operation in the operating method of a distributed file system according to an exemplary embodiment of the present invention;

FIG. 9 is a flowchart of a file writing operation in the operating method of a distributed file system according to an exemplary embodiment of the present invention; and FIG. 10 is a flowchart of an operation of handling a failure occurring in a metadata server in the operating method of a distributed file system according to an exemplary embodiment of the present invention.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. To clearly describe the present invention, parts irrelevant to the description will be omitted from the drawings.

The term "include," when used herein, does not preclude the presence or addition of one or more components, steps, operations, and/or elements other than stated components, steps, operations, and/or elements.

A distributed file system 100 according to an exemplary embodiment of the present invention will be described below with reference to FIGS. 1 to 4.

Figure 1:
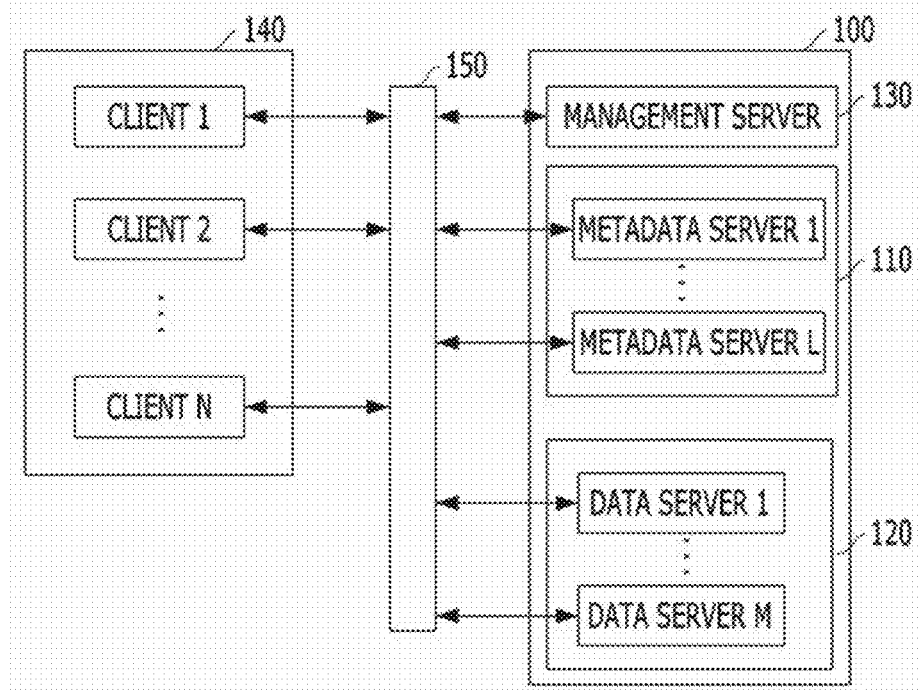
FIG. 1 is a block diagram of a distributed file system according to an exemplary embodiment of the present invention.
Figure 2:
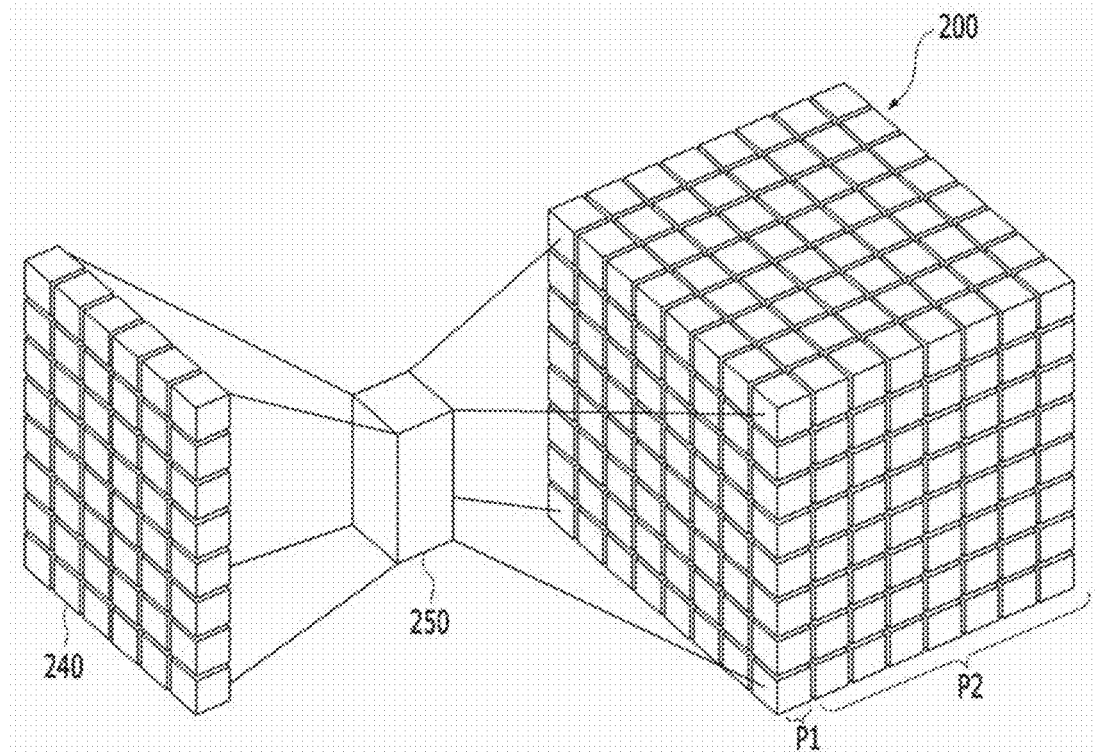
FIG. 2 shows an example of an arrangement structure of a distributed file system according to an exemplary embodiment of the present invention.

FIG. 1 is a block diagram of a distributed file system 100 according to an exemplary embodiment of the present invention. FIG. 2 shows an example of an arrangement structure of the distributed file system 100 according to an exemplary embodiment of the present invention.

The distributed file system 100 based on a torus network according to an exemplary embodiment of the present invention includes a plurality of metadata servers 110, a plurality of data servers 120, and at least one management server 130.

The plurality of metadata servers 110 store metadata of files. Here, with all of the plurality of metadata servers 110 operating in an active mode, a plurality of metadata servers 110, for example, two or three metadata servers 110, are grouped and interoperate with each other in an active-standby mode to provide high availability.

One of the metadata servers 110 may manage a preset number of groups of metadata servers 110. In this case, the single metadata server 110 may operate in the active mode for any one of the plurality of groups and also operate in a standby mode for another group.

The plurality of data servers 120 divide data and store the divided data in a distributed manner. In other words, the data servers 120 divide actual files or data into sub units and store the divided files or data in the distributed manner.

The management server 130 manages the plurality of metadata servers 110 and the plurality of data servers 120. The management server 130 monitors not only the metadata servers 110 and the data servers 120 but also monitors a plurality of clients 140 together and performs a recovery procedure when a failure occurs in the metadata servers 110. The management server 130 may exist in a torus network or may be independently disposed outside the torus network and directly connected to a switch 150.

Meanwhile, the management server 130 may be plural in number, but two management servers 130 are preferable in an exemplary embodiment of the present invention. The management server 130 also operates in the active-standby mode to provide high availability.

The one or more clients 140 access the distributed file system 100 and perform a file operation.

Meanwhile, each of the plurality of metadata servers 110, the plurality of data servers 120, the management server 130, and the clients 140 may include a communications module (not shown), a memory (not shown), and a processor (not shown).

The communications module may include both of a wired communications module and a wireless communications module. The wired communications module may be implemented as a power line communications device, a telephone line communications device, a home cable (multimedia over coax alliance (MoCA)) device, an Ethernet device, an institute of electrical and electronics engineers (IEEE) 1294 device, an integrated cable home network device, and an RS-485 control device. Also, the wireless communications module may be implemented by a technology including wireless local area network (WLAN), Bluetooth, high data rate (HRD) wireless personal area network (WPAN), ultra-wideband (UWB), Zigbee, impulse radio, 60-GHz WPAN, binary-code division multiple access (CDMA), wireless universal serial bus (USB), wireless high definition multimedia interface (HDMI), and so on.

A program for controlling the corresponding server is stored in the memory. Here, the term "memory" is a common designation of a non-volatile storage device which continually maintains stored information even without a power supply and a volatile storage device.

For example, the memory may include NAND flash memories including a compact flash (CF) card, a secure digital (SD) card, a memory stick, a solid state drive (SSD), a micro SD card, etc., magnetic computer storage devices, including a hard disk drive (HDD), etc., optical disc drives, including a compact disc (CD)-read only memory (ROM), a digital versatile disc (DVD)-ROM, etc., and so on.

The program stored in the memory may be implemented in the form of software or hardware, such as a field programmable gate array (FPGA) or an application-specific integrated circuit (ASIC), and may perform predetermined roles.

The plurality of metadata servers 110, the plurality of data servers 120, the management server 130, and the clients 140 may be connected through a network. The network denotes a connection structure in which nodes including terminals and servers can exchange information with each other. Examples of the network include a third generation partnership project (3GPP) network, a long term evolution (LTE) network, a world interoperability for microwave access (WiMAX) network, the Internet, a LAN, a PAN, a Bluetooth network, a satellite broadcast network, an analog broadcast network, a digital multimedia broadcasting (DMB) network, a wireless fidelity (WiFi) network, etc. but are not limited thereto.

As shown in FIG. 2, in the distributed file system 100 according to an exemplary embodiment of the present invention, the plurality of metadata servers 110, the plurality of data servers 120, and the at least one management server 130 are disposed on first to $n^{th}$ planes 200 each of which consists of a plurality of nodes.

Here, each node included in the first plane P1 is connected to the plurality of clients 240 through a switch 250 in the form of a fat tree. A plurality of metadata servers 110 and a plurality of data servers 120 included in the first plane P1 are connected to the clients 240 through the switch 250 to interface with the outside.

The plurality of metadata servers 110 and the plurality of data servers 120 included in the first plane P1 can each be directly interconnected with a plurality of metadata servers 110 and a plurality of data servers 120 included in the second to $n^{th}$ planes P2 based on a torus network without the switch 250.

In other words, nodes included in the first plane P1 and nodes included in the second to $n^{th}$ planes P2 may be interconnected not through the switch 250 but by being configured in the form of a torus network through direct network cable connections.

Accordingly, the metadata servers 110 and the data servers 120 constituting nodes included in the first to $n^{th}$ planes 200 according to an exemplary embodiment of the present invention may perform routing functions such as the routing information protocol (RIP) and the open shortest path first (OSPF) protocol.

Referring back to FIG. 1, numerous storage servers are required to provide an exabyte (EB)-level cloud storage. However, it is not possible for an administrator to manually and separately manage all nodes, and thus all the nodes are required to be automatically manageable at a single spot.

Accordingly, in the distributed file system 100 according to an exemplary embodiment of the present invention, the management server 130 serves to manage all associated nodes.

To this end, the management server 130 is initialized and started first. When initialization and startup of the management server 130 are finished, the management server 130 activates the routing functions of the plurality of metadata servers 110 and the plurality of data servers 120 included in the first to $n^{th}$ planes in the torus network according to preset information. Here, the management server 130 may check whether or not the routing functions of the plurality of metadata servers 110 and the plurality of data servers 120 function normally.

When the routing functions of the plurality of metadata servers 110 and the plurality of data servers 120 are activated, the management server 130 initializes and starts the plurality of metadata servers 110 according to registered information. The started metadata servers 110 transmit their information to the management server 130, and the management server 130 receives the information on the metadata servers 110 and registers the metadata servers 110.

When the registration of the metadata servers 110 is finished, the management server 130 may set an availability relationship through an active or a standby setting of the metadata servers 110.

When the setting of the metadata servers 110 is set, the management server 130 initializes and starts the plurality of data servers 120. The started data servers 120 transmit their information to the management server 130, and the management server 130 receiving the information on the data servers 120 registers the data servers 120.

When the initialization, startup, and registration process of the management server 130, the metadata servers 110, and the data servers 120 is finished, a startup of the distributed file system 100 according to an exemplary embodiment of the present invention is finished. Accordingly, the clients 140 can connect to the distributed file system 100 and perform file exchanging and so on.

For reference, components shown in FIG. 1 according to an exemplary embodiment of the present invention may be implemented in the form of software or hardware, such as an FPGA or an ASIC, and may perform predetermined roles.

However, the components are not limited to software or hardware, and each component may be configured to be in an addressable storage medium or configured to run one or more processors.

Therefore, examples of components include components such as software components, object-oriented software components, class components, and task components, processes, functions, attributes, procedures, subroutines, segments of program code, drivers, firmware, microcode, circuitry, data, databases, data structures, tables, arrays, and variables.

The components and functionality provided in the components may be combined into fewer components or subdivided into additional components.

Arrangement structures of the distributed file system 100 according to an exemplary embodiment of the present invention for a case in which the distributed file system 100 does not provide the routing function to the clients 140 and a case in which the distributed file system 100 provides the routing function to the clients 140 will be described below with reference to FIGS. 3 and 4.

Meanwhile, the initialization, startup, and registration process described with reference to FIG. 2 can be applied to both embodiments which will be described below and are dependent on whether or not the routing function is provided.

Figure 3:
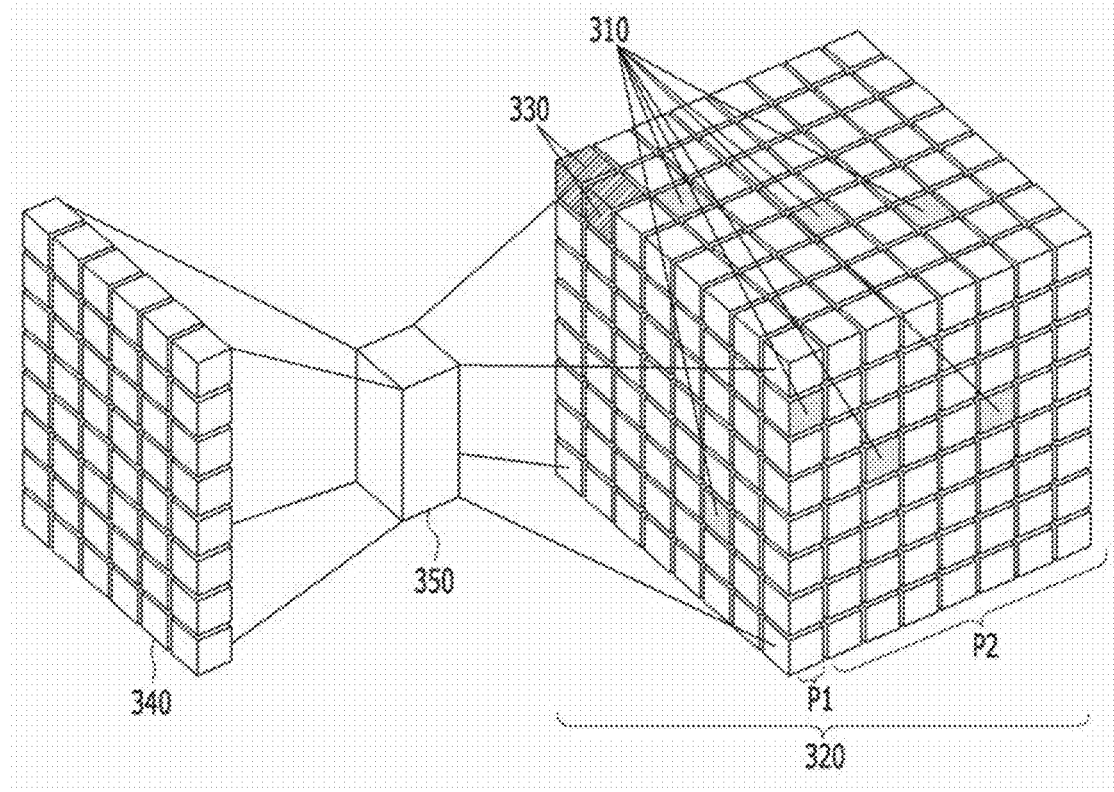
FIG. 3 shows an example of an arrangement structure for a case in which a distributed file system according to an exemplary embodiment of the present invention does not provide a routing function.

FIG. 3 shows an example of an arrangement structure for a case in which the distributed file system 100 according to an exemplary embodiment of the present invention does not provide the routing function to clients 340.

As shown in FIG. 3, in the distributed file system 100 according to an exemplary embodiment of the present invention, the plurality of clients 340 are only connected to a plurality of metadata servers 310 and a plurality of data servers 320 included in a first plane P1 through a switch 350 and exchange data.

A plurality of metadata servers 310 and a plurality of data servers 320 included in second to $n^{th}$ planes P2 are connected to the plurality of clients 340 through the plurality of metadata servers 310 and the plurality of data servers 320 included in the first plane P1 and exchange data.

In other words, when a client 340 transmits data to only one node disposed on the first plane P1, nodes included in the first to $n^{th}$ planes interconnected in a torus structure can communicate with each other and process data required by the client 340.

Accordingly, between the clients 340 and nodes disposed on the second to $n^{th}$ planes P2 in the torus network, nodes disposed on the first plane P1 provide a relay function of transferring a request of a client 340, such as namespace calculation or file input or output, to nodes in the torus network or transferring the result to the client 340.

Here, the management server 330 may be disposed at a node of the first plane P1, and the metadata servers 310 and the data servers 320 may be disposed at arbitrary nodes in the first to $n^{th}$ planes P1 and P2 according to a policy of an administrator.

Meanwhile, the distributed file system 100 according to an exemplary embodiment of the present invention may perform a mounting procedure, a file opening procedure, a file reading procedure, and a file writing procedure for a case in which the routing function of a client 140 is not activated and perform a procedure for handling a failure occurring in a metadata server 110. This will be described in further detail with reference to FIGS. 6 to 10.

Figure 4:
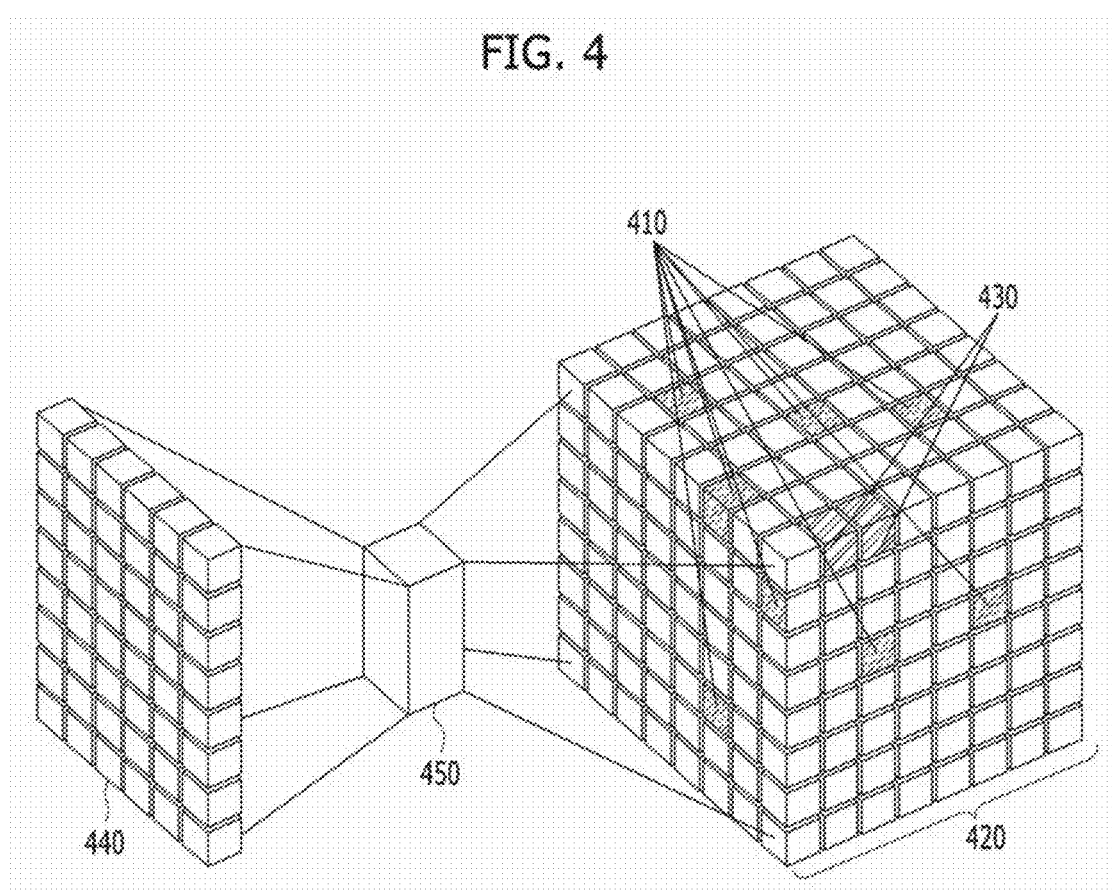
FIG. 4 shows an example of an arrangement structure for a case in which a distributed file system according to an exemplary embodiment of the present invention provides a routing function.

FIG. 4 shows an example of an arrangement structure for a case in which the distributed file system 100 according to an exemplary embodiment of the present invention provides the routing function to clients 440.

When the routing functions of the clients 440 are activated in the distributed file system 100 according to an exemplary embodiment of the present invention, the plurality of clients 440 may exchange data with a plurality of metadata servers 410 and a plurality of data servers 420 included in first to $n^{th}$ planes through a switch 450 as shown in FIG. 4. In other words, since the routing functions of the clients 440 are activated, the clients 440 can also basically communicate with nodes disposed on the second to $n^{th}$ planes behind the first plane.

Accordingly, unlike the case of FIG. 3, the function of a relay node is not necessary, and thus a management server 430, the metadata servers 410, and the data servers 420 can be disposed at arbitrary nodes in the first to $n^{th}$ planes according to a policy of an administrator.

An operating method of the distributed file system 100 according to an exemplary embodiment of the present invention will be described below with reference to FIGS. 5 to 10.

Figure 5:
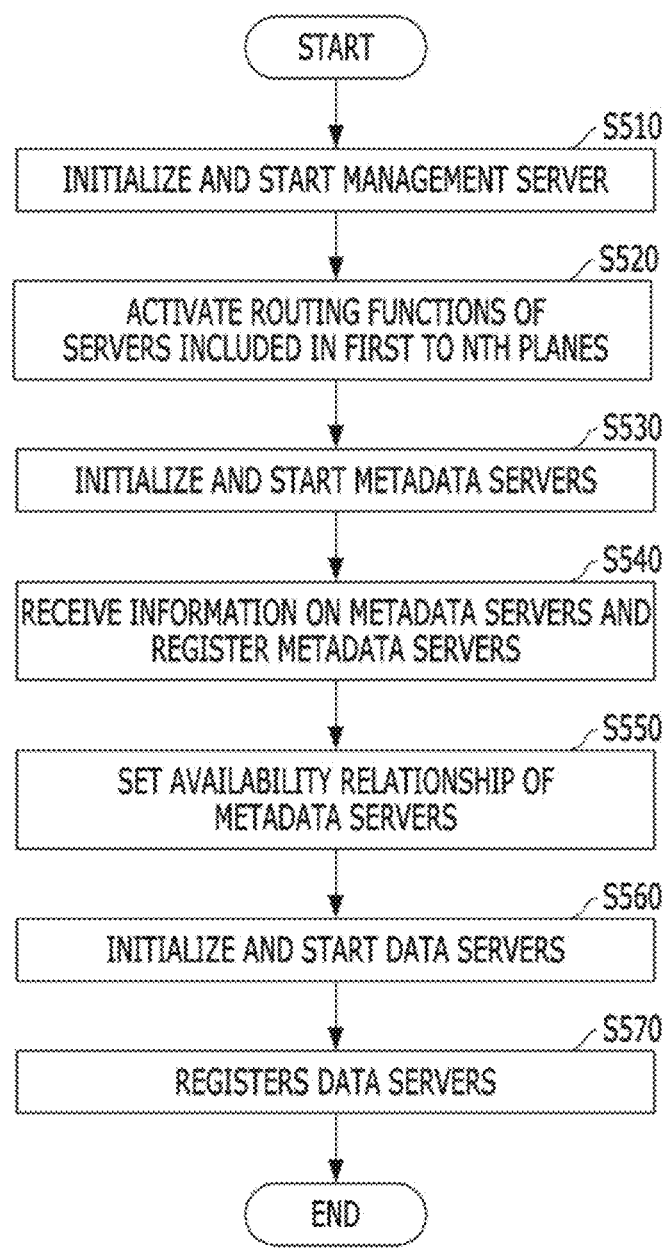
FIG. 5 is a flowchart of a startup operation in an operating method of a distributed file system according to an exemplary embodiment of the present invention.

FIG. 5 is a flowchart of a startup operation in the operating method of the distributed file system 100 according to an exemplary embodiment of the present invention.

In the operating method of the distributed file system 100 according to an exemplary embodiment of the present invention, the management server 130 is initialized and started first (S510).

Subsequently, the management server 130 activates the routing functions of the plurality of metadata servers 110 and the plurality of data servers 120 included in first to $n^{th}$ planes (S520).

Next, the management server 130 initializes and starts the plurality of metadata servers 110 (S530), receives information on the metadata servers 110 from the plurality of metadata servers 110, and registers the plurality of metadata servers 110 (S540). When the registration of the metadata servers 110 is finished, the management server 130 sets an availability relationship of the plurality of metadata servers 110 (S550).

After this process is finished, the management server 130 initializes and starts the plurality of data servers 120 (S560). Then, the management server 130 receives information on the data servers 120 from the data servers 120 and registers the data servers 120 (S570).

When the initialization, startup, and registration process of the management server 130, the metadata servers 110, and the data servers 120 is finished, startup of the distributed file system 100 according to an exemplary embodiment of the present invention is finished, and the clients 140 can connect to the distributed file system 100 and perform file exchanging and so on.

Meanwhile, the initialization, startup, and registration process of the management server 130, the metadata servers 110, and the data servers 120 has been described in detail with reference to FIGS. 1 and 2 and will be omitted below.

Each operation of the distributed file system 100 when the routing functions of the clients 140 are not activated will be described below with reference to FIGS. 6 to 10.

Figure 6:
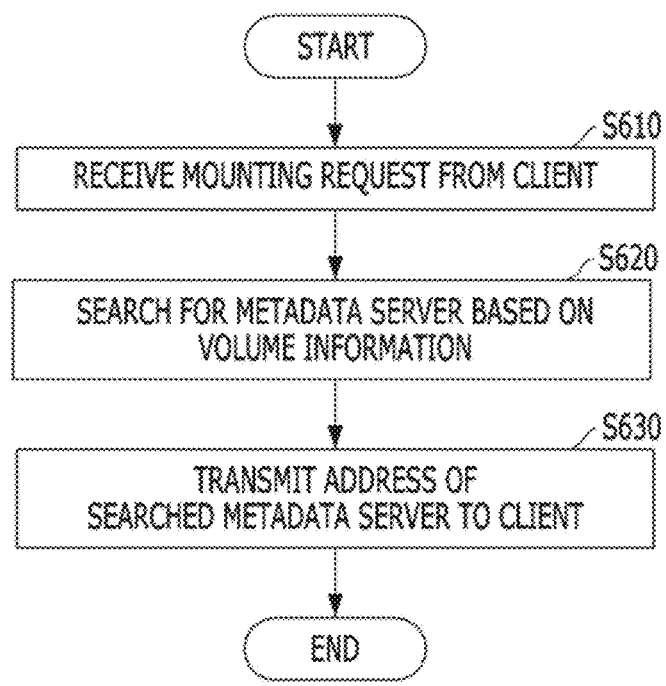
FIG. 6 is a flowchart of a mounting operation in the operating method of a distributed file system according to an exemplary embodiment of the present invention.

FIG. 6 is a flowchart of a mounting operation in the operating method of the distributed file system 100 according to an exemplary embodiment of the present invention.

First, a client 140 transmits information on a volume to which the client 140 intends to connect, thereby requesting to mount. When the management server 130 receives the mounting request including the information on the volume to which the client 140 intends to connect from the client 140 (S610), the management server 130 searches for a metadata server 110 corresponding to root directory information included in the volume information (S620). Since there are four addresses for accessing the corresponding node in a two-dimensional (2D) torus network and six addresses in a 3D torus network, the management server 130 searches therein for an address of the metadata server 110 having the optimal path.

When the address of the metadata server 110 is searched, the management server 130 transmits the searched address of the metadata server 110 to the client 140 (S630). In this process, the routing function of the client 140 is not activated, and thus the management server 130 also transmits an address list of a plurality of metadata servers 110 and a plurality of data servers 120 included in the first plane. Accordingly, the client 140 stores the searched address of the metadata server 110 and the address list in a local storage until the metadata server 110 is unmounted.

When this process is finished, users can perform various file operations which can be used in a local file system in the distributed file system 100.

FIG. 7 is a flowchart of a file opening operation in the operating method of the distributed file system 100 according to an exemplary embodiment of the present invention.

First, among the plurality of metadata servers 110 and the plurality of data servers 120 included in the address list received from the management server 130, the client 140 selects as a relay server any one server located at the shortest distance from the address of the metadata server 110 which has been searched by the management server 130 and corresponds to the root directory information included in the volume information (S710).

Subsequently, the client 140 requests file information of the searched metadata server 110 from the selected relay server. When the request is received by the relay server (S720), the relay server analyzes the request received from the client 140 and requests file information from the searched metadata server 110 according to the file information request (S730).

When the metadata server 110 searches for file information according to the request received from the relay server and the relay server receives the file information from the searched metadata server 110 (S740), the relay server transmits the received file information to the client 140 (S750).

The client 140 receiving the file information through this process can notify a user that file opening has succeeded.

FIG. 8 is a flowchart of a file reading operation in the operating method of the distributed file system 100 according to an exemplary embodiment of the present invention.

In the file reading process in the distributed file system 100 according to an exemplary embodiment of the present invention, when the client 140 requests a file layout to read from the searched metadata server 110 through the relay server (S810), the metadata server 110 determines Internet protocol (IP) addresses of data servers 120 corresponding to the file layout (S820). Then, the metadata server 110 transmits the file layout and the IP addresses of the data servers 120 to the client 140 through the relay server (S830).

The client 140 determines a data server 120 to which a read request will be transmitted using information including an offset, etc. of the file to be read.

When the data server 120 in which the file to be read is stored is determined by the client 140, the relay server requests the file from the data server 120 determined by the client 140 (S840), and the data server 120 transmits the file requested by the client 140 through the relay server (S850).

Accordingly, the client 140 can return read data to the user.

FIG. 9 is a flowchart of a file writing operation in the operating method of the distributed file system 100 according to an exemplary embodiment of the present invention.

When the client 140 requests information on a data server 120 in which a file will be written from the searched metadata server 110 through the relay server (S910), the metadata server 110 returns information on the data server 120 and a file layout to the client 140 (S920). As necessary, the metadata server 110 may generate a chunk and return the information on the data server 120 and the file layout.

When the data server 120 receives a file writing request from the client 140 through the relay server (S930), the data server 120 performs a file writing operation (S940). Then, the data server 120 may return the result to the client 140 through the relay server.

Accordingly, the client 140 can notify the user that the file writing operation has succeeded.

FIG. 10 is a flowchart of an operation of handling a failure occurring in a metadata server 110 in the operating method of the distributed file system 100 according to an exemplary embodiment of the present invention.

When a fault occurs in a metadata server 110, the distributed file system 100 according to an exemplary embodiment of the present invention can handle the fault. At this time, to provide high availability, the metadata server 110 and the management server 130 operate in a primary-subordinate mode, that is, a master-slave mode.

When the management server 130 detects a fault of a master metadata server in operation (S1010), the management server 130 inquires a sub metadata server corresponding to the faulty metadata server (S1020). In other words, the management server 130 inquires which node is the slave metadata server corresponding to the master metadata server.

When the inquiry about a sub metadata server is finished, the management server 130 promotes the sub metadata server corresponding to the faulty primary metadata server to a primary metadata server (S1030). Then, the management server 130 allocates a sub metadata server to the promoted metadata server (S1040). Also, the management server 130 requests a fault recovery procedure by transferring information on the allocated new sub metadata server to the promoted metadata server (S1050).

According to the request for a fault recovery procedure, the promoted metadata server performs a service corresponding to the metadata server (S1060) and copies its metadata to the allocated sub metadata server (S1070).

Through this process, the fault recovery procedure of the metadata server 110 can be finished.

Meanwhile, after the fault occurs, the client 140 is required to connect to the new metadata server, and the process is as follows.

First, the client 140 detects a failure of a socket connection with the faulty metadata server. Accordingly, the client 140 requests information on the new metadata server from the management server 130 (S1080).

The management server 130 receiving the request from the client 140 may transmit information on the promoted metadata server to the client 140 (S1090). Accordingly, the client can again attempt a connection to the new metadata server.

In the above description, operation S510 to S1090 may be subdivided into sub-operations or combined into fewer operations according to embodied examples. Also, some operations may be omitted or performed in different order as necessary. Further, although omitted, descriptions made for the distributed file system 100 in FIGS. 1 to 4 apply to the operating method of FIGS. 5 to 10.

According to an exemplary embodiment of the present invention, it is possible to solve the problem of being unable to support an EB-level capacity based on the related art of a hierarchical fat-tree topology with switches.

Also, since storage servers are directly interconnected to form a torus topology without switches and clients are connected to a switch, it is possible to reduce the complexity of a system as much as possible.

Further, it is possible to provide an EB-level storage without modifying much of the existing distributed file system in use.

The operating method of the distributed file system 100 according to an exemplary embodiment of the present invention can be implemented in the form of a computer program stored in a medium executed by a computer or a recording medium including computer-executable instructions. Computer-readable media may be any available media that can be accessed by a computer and include all of volatile and non-volatile media and removable and non-removable media. Also, the computer-readable media may include all of computer storage media and communication media. The computer storage media include computer-readable instructions, data structures, program modules, or all of volatile and non-volatile media, and removable and non-removable media implemented by arbitrary methods or technology for storing information such as data. The communications media typically embody computer-readable instructions, data structures, program modules, data in a modulated data signal, such as a carrier wave, or other transmission mechanisms and include any information delivery media.

Although the method and system of the present invention have been described with particular embodiments, some or all of components or operations thereof may be implemented by a computer system having a general-purpose hardware architecture.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A distributed file system based on a torus network, the distributed file system comprising:
   a plurality of metadata servers configured to store metadata of files;
   a plurality of data servers configured to divide data and store the divided data in a distributed manner; and
   at least one management server configured to manage the metadata servers and the data servers,
   wherein the plurality of metadata servers, the plurality of data servers, and the at least one management server are disposed on first to $n^{th}$ planes each of which consists of a plurality of nodes, and
   the first plane is connected to a plurality of clients through a switch.

2. The distributed file system of claim 1, wherein a plurality of metadata servers and a plurality of data servers included in the first plane are directly interconnected with a plurality of metadata servers and a plurality of data servers included in the second to $n^{th}$ planes without the switch.

3. The distributed file system of claim 2, wherein, when initialization and startup of the management server are finished, the management server activates routing functions of the plurality of metadata servers and the plurality of data servers included in the first to $n^{th}$ planes,
   when the routing functions of the plurality of metadata servers and the plurality of data servers are activated, the management server initializes and starts the plurality of metadata servers, receives information on the metadata servers to register the metadata servers, sets an availability relationship of the metadata servers, initializes and starts the plurality of data servers, and receives information on the data servers to register the data servers.

4. The distributed file system of claim 3, wherein the plurality of clients exchange data with only the plurality of metadata servers and the plurality of data servers included in the first plane through the switch, and the plurality of metadata servers and the plurality of data servers included in the second to $n^{th}$ planes exchange data with the plurality of clients through the plurality of metadata servers and the plurality of data servers included in the first plane.

5. The distributed file system of claim 4, wherein the management server is disposed at a node of the first plane, and the metadata servers and the data servers are disposed at arbitrary nodes in the first to $n^{th}$ planes.

6. The distributed file system of claim 4, wherein, when a mounting request including information on a volume to which a client intends to connect is received from the client, the management server searches for a metadata server corresponding to root directory information included in the volume information and transmits an address of the searched metadata server to the client.

7. The distributed file system of claim 6, wherein the management server also transmits an address list of the plurality of metadata servers and the plurality of data servers included in the first plane to the client, and the client stores the address of the searched metadata server and the address list in a local storage until the metadata server is unmounted.

8. The distributed file system of claim 7, wherein the client selects as a relay server any one server located at a shortest distance from the address of the searched metadata server among the plurality of metadata servers and the plurality of data servers included in the address list, requests file information of the searched metadata server from the selected relay server, and receives the requested file information from the relay server, the relay server requests the file information from the searched metadata server according to the request for the file information, and when the searched metadata server transmits the file information to the relay server, the file information is transmitted to the client.

9. The distributed file system of claim 8, wherein, when the client requests a file layout from the searched metadata server through the relay server, the searched metadata server determines Internet protocol (IP) addresses of data servers corresponding to the file layout and transmits the file layout and the IP addresses of the data servers to the client through the relay server, when a data server storing a file to be read is determined by the client, the client requests the file from the determined data server through the relay server, and the data server transmits the file requested by the client through the relay server.

10. The distributed file system of claim 8, wherein, when the client requests information on a data server in which a file will be written from the searched metadata server through the relay server, the searched metadata server transmits information on the data server and a file layout to the client, and when a file writing request is received from the client through the relay server, the data server performs a file writing operation.

11. The distributed file system of claim 5, wherein, when a fault of a metadata server in operation is detected, the management server promotes a sub metadata server corresponding to the faulty metadata server to a primary metadata server, allocates a sub metadata server to the promoted metadata server, and requests a fault recovery process by transferring information on the allocated sub metadata server to the promoted metadata server, and according to the request for a fault recovery process, the promoted metadata server performs a service corresponding to the metadata server and copies metadata to the allocated sub metadata server.

12. The distributed file system of claim 11, wherein, when a client detects a failure of socket connection with the faulty metadata server and requests information on a new metadata server from the management server, the management server transmits information on the promoted metadata server to the client.

13. The distributed file system of claim 2, wherein the plurality of clients exchange data with the plurality of metadata servers and the plurality of data servers included in the first to $n^{th}$ planes through the switch, and the management server, the metadata servers, and the data servers are disposed at arbitrary nodes in the first to $n^{th}$ planes.

14. An operating method of a distributed file system including a plurality of metadata servers, a plurality of data servers, and at least one management server disposed on a first to $n^{th}$ planes consisting of a plurality of nodes, the operating method comprising:

initializing and starting the management server;

activating, by the management server, routing functions of the plurality of metadata servers and the plurality of data servers included in the first to $n^{th}$ planes;

initializing and starting, by the management server, the plurality of metadata servers;

receiving, by the management server, information on the plurality of metadata servers and registering the plurality of metadata servers;

setting, by the management server, an availability relationship of the plurality of metadata servers;

initializing and starting, by the management server, the plurality of data servers; and receiving, by the management server, information on the data servers and registering the data servers, wherein a plurality of metadata servers and a plurality of data servers included in the first plane are each directly interconnected with a plurality of metadata servers and a plurality of data servers included in the second to $n^{th}$ planes without a switch.

15. The operating method of claim 14, further comprising:

receiving, by the management server, a mounting request including information on a volume to which a client intends to connect;

searching for, by the management server, a metadata server corresponding to root directory information included in the volume information; and transmitting, by the management server, an address of the searched metadata server to the client, wherein the management server also transmits an address list of the plurality of metadata servers and the plurality of data servers included in the first plane to the client, and the client stores the address of the searched metadata server and the address list in a local storage until the metadata server is unmounted.

16. The operating method of claim 15, wherein the plurality of clients only exchange data with the plurality of metadata servers and the plurality of data servers included in the first plane through the switch, the plurality of metadata servers and the plurality of data servers included in the second to $n^{th}$ planes exchange data with the plurality of clients through the plurality of metadata servers and the plurality of data servers included in the first plane, the management server is disposed at a node of the first plane, and the metadata servers and the data servers are disposed at arbitrary nodes in the first to $n^{th}$ planes.

17. The operating method of claim 16, further comprising:

requesting, by the client, file information of the searched metadata server from a relay server selected by the client;

requesting, by the relay server, the file information from the searched metadata server according to the request for the file information;

receiving, by the relay server, the file information from the searched metadata server; and transmitting, by the relay server, the file information to the client, wherein the relay server is disposed at a shortest distance from the address of the searched metadata server among the plurality of metadata servers and the plurality of data servers included in the address list received by the client.

18. The operating method of claim 17, further comprising:

requesting, by the client, a file layout from the searched metadata server through the relay server;

determining, by the searched metadata server, Internet protocol (IP) addresses of data servers corresponding to the file layout;

transmitting, by the searched metadata server, the file layout and the IP addresses of the data servers to the client through the relay server;

when a data server storing a file to be read is determined by the client, requesting, by the client, the file from the determined data server through the relay server; and transmitting, by the data server, the file requested by the client through the relay server.

19. The operating method of claim 17, further comprising:

requesting, by the client, information on a data server in which a file will be written from the searched metadata server through the relay server;

transmitting, by the searched metadata server, the information on the data server and a file layout to the client through the relay server;

receiving, by the data server, a file writing request from the client through the relay server; and performing, by the data server, a file writing operation.

20. The operating method of claim 16, further comprising:

detecting, by the management server, a fault of a metadata server in operation;

promoting, by the management server, a sub metadata server corresponding to the faulty metadata server to a primary metadata server;

allocating, by the management server, a sub metadata server to the promoted metadata server;

transferring, by the management server, information on the allocated sub metadata server to the promoted metadata server to request a fault recovery procedure;

performing, by the promoted metadata server, a service corresponding to the promoted metadata server according to the request for a fault recovery procedure; and copying, by the promoted metadata server, metadata to the allocated sub metadata server.

\* \* \* \* \*